United States Patent [19]

Lapeyre

[11] Patent Number: 4,720,631

[45] Date of Patent: Jan. 19, 1988

[54] ELECTRO-OPTICAL COMPASS CARD WHEREIN TRANSMISSIVE MEMBER HAS RANDOM PATTERNS THAT REPEAT FOR PARTICULAR ROTATIONAL POSITIONS

[75] Inventor: James M. Lapeyre, New Orleans, La.

[73] Assignee: The Laitram Corporation, Harahan, La.

[21] Appl. No.: 808,296

[22] Filed: Dec. 12, 1985

[51] Int. Cl.⁴ .............................................. G01D 5/34
[52] U.S. Cl. .................... 250/231 SE; 340/347 P; 250/237 G
[58] Field of Search ............... 250/231 SE, 237 G; 340/347 P; 33/125 C; 356/395

[56] References Cited

U.S. PATENT DOCUMENTS

| | | | |
|---|---|---|---|
| 2,989,642 | 6/1961 | Svec | 250/231 SE |
| 3,824,587 | 7/1974 | Fowler | 250/231 SE |
| 3,999,064 | 12/1976 | Kramer | 250/231 SE |
| 4,110,610 | 8/1978 | Mueller et al. | 250/231 SE |
| 4,113,388 | 9/1978 | Gates et al. | 250/237 G |
| 4,315,252 | 2/1982 | Tagami | 250/231 SE |
| 4,334,152 | 6/1982 | Dakin et al. | 250/231 SE |
| 4,492,861 | 1/1985 | Kebschull et al. | 250/237 G |

*Primary Examiner*—David C. Nelms
*Assistant Examiner*—William L. Oen
*Attorney, Agent, or Firm*—James C. Kesterson

[57] ABSTRACT

Apparatus, such as a compass, for determining the positional relationship between two structures having limited motion therebetween is disclosed. The apparatus includes a photoelectric array spaced from an illuminating or light source. The array and light source are mounted to a first structure or member, such as for example, a compass housing. A second member suitable for limited motion such as a rotating disc having a mask mounted thereon is located between the array and the light source so as to substantially block light transmitted from the source being received by the array. The mask, however, includes light transmission areas of selected shapes, such as for example, a spiral, or three lines. These light transmissive areas result in the illumination of unique, random patterns of individual elements of the array for each specific relative position between the first member and the second member. Also included are means such as a read only memory (ROM) which has stored therein information correlating the individual unique patterns with each specific relative position. In operation the specific pattern of illumination on the array is compared to the stored information and the specific relative position is then provided to a display.

17 Claims, 14 Drawing Figures

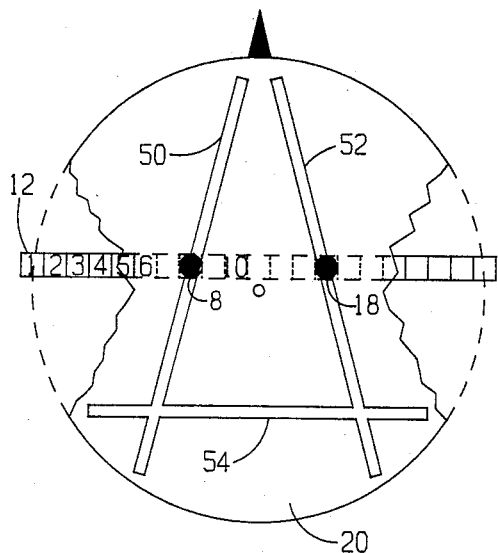
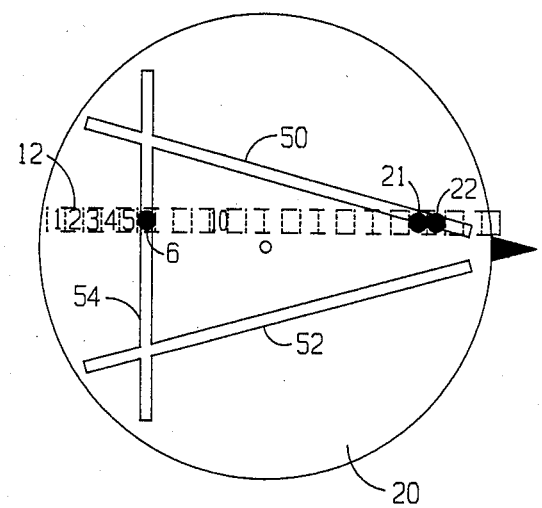
FIGURE 3A
FIGURE 3B
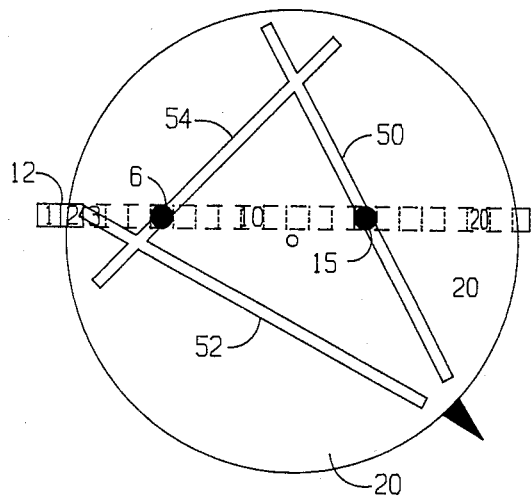
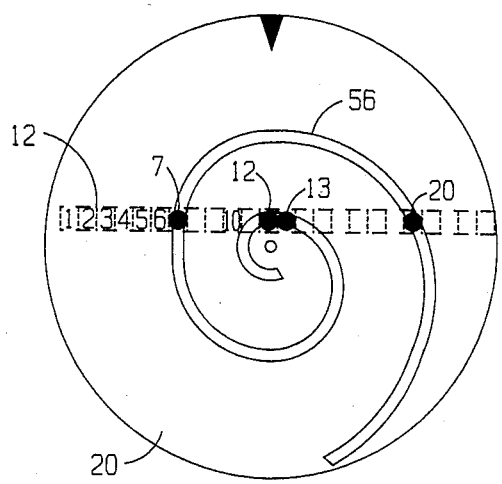
FIGURE 3C
FIGURE 4A

ELECTRO-OPTICAL COMPASS CARD WHEREIN TRANSMISSIVE MEMBER HAS RANDOM PATTERNS THAT REPEAT FOR PARTICULAR ROTATIONAL POSITIONS

TECHNICAL FIELD

This invention relates to highly accurate apparatus for determining the position of one body with respect to a second body. More particularly, in a preferred embodiment the invention relates to a highly accurate and improved technique for shaft encoding or for sensing the angular position of a compass card or the like used in electro-optical compasses. The technique results in improved accuracy and at the same time permits the use of less precision manufacturing techniques.

BACKGROUND OF THE INVENTION

As disclosed in U.S. Pat. Nos. 3,888,016; 3,772,503 and 3,927,474, incorporated herein by reference, positional indicators and more particularly digital compasses had been provided in which the angular orientation of the compass card is determined by a primary optical pickoff which involves an encoder disc driven by the magnetic sensing element of the compass. The encoded disc is provided with digital encoder markings or a digital code that in general results in establishment of the angular position of the encoded disc and thus the angular position of the magnetic element of the compass. The accuracy to which position can be ascertained with a digitally encoded compass is on the order of 2° (for example, ±1°).

U.S. Pat. No. 3,772,503 discloses a typical usage of such a compass card technique. According to this patent, an inner pattern on the compass card would typically be a "Gray" code with the rotational position of the disc being detected by detector array positioned on one side of the disc so that it detects the light transmissive and light opaque portions of the inner pattern (i.e. the Gray code). To this end a light source is positioned to one side of the coded disc and the detector array is positioned on the other side along a radius of the disc. The transmissive pattern or Gray scale detected by the detector array is then decoded in a conventional manner and provides an output corresponding to the angular position of the disc with an accuracy of for example, 2°. It will be appreciated of course, that resolution of the Gray code, and of most digital coding systems is determined by that portion of the pattern which represents the least significant bit. In the example discussed in U.S. Pat. No. 3,772,503, the light and dark areas which are at the peripheral of the inner pattern determine the resolution of the primary optical pickoff system.

According to another U.S. Pat. No. 4,414,754 by the same inventor as the present application, there is disclosed another improved technique which uses a second analog optical pickoff array which works in combinaton with the digital pickoff array to achieve substantial increased accuracy.

However, although these improved techniques have resulted in a great reduction in the size of optical compasses, the resolution is still effectively determined by the number of digital pattern rings located on the compass card. And to date, optical digital compass cards are limited to a realistic size of somewhat less than about one inch. Even the technique of U.S. Pat. No. 4,414,754 discussed above which allows significantly greater accuracy, requires an increased diameter of the compass card to allow for the presentation of the analog portion of the compass card.

Therefore, it is an object of this invention to provide an optical compass having extreme accuracy while at the same time allowing minimal size of the compass.

Other prior art patents which may be considered somewhat related to the present invention include such U.S. patents as U.S. Pat. Nos. 2,604,528 issued to A. A. Obermaier on July 22, 1952; 3,254,226 issued to A. Bobula et al on May 31, 1966; and 3,327,125 issued to L. W. Herchenroeder on June 20, 1967. Each of these patents discloses detection of radiant energy as it passes through a rotating disc. In addition, each of the patents includes the idea of the radient energy being transmitted through the disc in transparent or translucent areas of the disc which are arranged in a spiral manner on the surface of the disc.

U.S. Pat. Nos. 4,031,630 and 4,091,543 each assigned to the same assignee as the present application disclose the use of a ROM (read only memory) to store compass deviation corrections which are then combined with the actual compass reading to provide a corrected reading. However, it will be appreciated by those skilled in the art that the techniques disclosed in these two patents cannot improve the overall resolution of the digital compass but only provide deviation corrections to those readings provided by the digital compass. To achieve greater accuracy and resolution of optical compasses, or alternately to reduce the size while maintaining the present resolution and/or accuracy of optical compasses, already requires meticulous and careful placing of the individual elements in manufacturing the code cards and positioning the pickup arrays and the bearing position of the rotating compass card. That is, there is very little room for error in placing the pickup arrays and the compass card bearings if the desired accuracy is to be achieved. Consequently, to increase resolution or decrease the actual size of the compass card while maintaining the present accuracy could make the task even more difficult. Therefore, it is another object of the present invention to provide a high resolution, miniaturized and highly accurate compass card which does not require the careful and meticulous manufacturing techniques of the prior art optical compasses.

It is still another object of the present invention to provide an inexpensive and simplified method of manufacturing high resolution optical compasses.

Other objects and advantages will be obvious, and will in part appear hereinafter, and will be accomplished by the present invention which provides a system for determining the positional relationship between a first and second member suitable for a limited motion there between. An example of such first and second members include a magnetic compass card and a housing thereof. The system of this invention includes such a first member having a multiplicity of means such as, a photoelectric pickup array for detecting light or radiant energy. Each of the multiplicity of detectors in the array provides an output signal indicative of whether or not radiant energy has impinged upon that detector. It is also important, that each of the optical pickup elements or detectors in the array be maintained in a fixed position relationship with every other element of the array. Also included is a source of light or radiant energy positioned so as to direct radiant energy toward the array so that the energy will be received by each element of the array so long as an obstruction is not between the two. A second member, such as for example, a rotating disc with a mask having transmissive areas is positioned between the multiplicity of optical pickup elements or detectors and the radiant energy source. This mask on the rotating disc blocks the radiant energy from impinging on the multiplicity of light detectors except for that radiant energy which is allowed to pass through the transmission areas or slits on the mask. Thus, only a portion of the radiant energy from the source will be transmitted through the rotatable disc. Therefore, the specific ones of the multiplicity of optical pickup elements or light detectors receiving the radiant energy will depend upon the relative position of the rotating disc or second member with respect to the position of the first member which supports the array of photodetectors. There is also included a means (such as a Read Only Memory) for storing and providing, upon command, information representative of a multiplicity of specific relative positions between the first and second members and a specific combination of activated optical pickup elements for each such position. These specific relative positions are determined as a function of the specific ones of the photoelectric pickup elements which receive the impinging radiant energy from the source for each position. Thus, there is a different combination of activated radiant energy monitors or pickups for each specific position. During operation, the combination of specific optical pickups which are activated by the radiant energy source at a specific location of the second member are then compared with the stored information until a match is found. Once the match is achieved, the specific relative position of the first member to the second member is known. In a preferred embodiment, the mask or second member will rotate in response to a magnetic compass, and the first member will function as the compass housing secured in a fixed manner or position to a moving vehicle such as a ship. Thus, the magnetic heading of the vehicle or ship can be determined.

BRIEF DESCRIPTION OF THE DRAWINGS

The above features of the present invention will be more clearly understood from consideration of the following description in connection with the accompanying drawings in which:

FIGS. 3A, 3B and 3C, show a top view of the embodiment of the present invention wherein a compass card having three randomly located light transmissive slits thereon operates in combination with an array of optical pickup elements.

FIGS. 4A, 4B and 4C, discloses top views of another embodiment of the compass card of FIG. 3 except there is a single spiral slit or transmissive area which operates in combination with the array of a multiplicity of pickup elements.

BEST MODE FOR CARRYING OUT THE INVENTION

Figure 1:
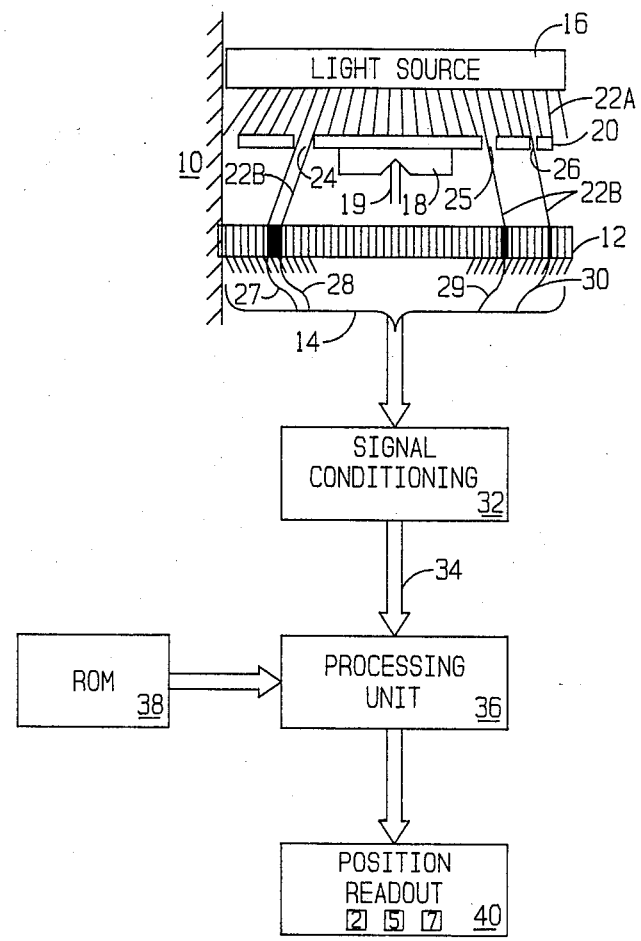
FIG. 1 is a partial side view and block diagram showing the features of the present invention.

Referring now to FIG. 1, there is shown a block diagram of the apparatus of this invention. As shown a first structure member 10 supports a multielement array of, or multiplicity of photoelectric detectors 12. The multiplicity of detectors 12 may be a significantly large number such as a hundred or perhaps even a thousand or more individual detectors. The detectors are typically aligned in a straight line, but such linear alignment is not necessary so long as the relative position of each of the multiplicity remains fixed. Each element of the array will produce an electrical output on a signal lead indicated generally by bracket 14 whenever radiant energy or light energy of a selected frequency impinges on the element. As an example, a suitable array for this purpose includes a 1728 element array 0.88 inches long, having part number TC101 and manufactured by the Texas Instrument Company of Dallas, Tex. In one embodiment, the array which has a great number of photo detector elements may for example be connected securely to and move in cooperation with a first member 10 such as for example the support structure of a compass which in turn is connected to the body or structure of a ship. Further as shown, there is a light source 16 which may be an aligned group of individual light sources or one elongated light source such as an electro luminiscent device which is directed towards the array and is so positioned that radiant energy or light from light source 16 will impinge on each of the elements in array 12 so long as the radiant energy is not blocked by some physical object. At this point it is important to clearly understand that each of the photodetector elements in the array 12 will maintain a fixed position relationship with every other photodetector element in the array, and that for most applications light source 16 also maintains a fixed position with respect to the array. Also in the embodiment as shown, there is a second member 18 supported by a member 19 which could be a shaft or pivot as discussed below and which includes a mask 20. Mask 20 is positioned between the multiplicity of photodetectors 12 and the light source 16 such that substantially all of the array is shielded from the radiant energy 22A emitting from light source 16. However, of most importance, is the fact that mask 20 also includes transmissive areas which will allow the passage of light therethrough such that certain or select ones of the multiplicity of photodetector elements will receive radiant energy 22B. As shown in the example of FIG. 1, mask 20 is shown having three light transmissive areas 24, 25 and 26. These transmissive areas allow the radiant energy 22B to strike selected ones of the array or the multiplicity of photodetectors such that a signal is sent out on lines 27, 28, 29 and 30 indicating light has impinged upon these elements. As an example, it will be appreciated by those skilled in the art if the structure 18 and 20 represents a compass card having a center axis which rotates or pivots on member 19 in response to the forces of a magnetic compass, then rotation of the mask 20 will result in different ones of the multiplicity of photoelectric elements being energized as the transmissive areas 24, 25 and 26 move with respect to array 12. That is, a unique, non-repeating (in 360°) random pattern of the photodetector elements will receive light from source 16 for specific and discrete rotational positions of the mask. Similarly, in a shaft encoder if the mask 20 is mounted to a rotating shaft, different combination or unique non-repeating random patterns of photoelectric elements will be energized as the mask rotates. Thus, it will be appreciated that depending upon the respective locations of transmissive areas 24, 25 and 26 (which as will be understood in later discussion, will vary depending upon the position of the mask) light through these areas 24, 25 and 26 may strike any one of the multiplicity of photoelectric elements in array 12.

However, for purposes of explanation it will be appreciated that in the position shown in FIG. 1, only four elements are activated by the light passing through passages 24, 25 and 26 such that electrical signals are sent to signal conditioning circuitry 32 by means of electrical lines 27, 28, 29 and 30. Signal conditioning circuitry 32 may be any suitable circuitry to prepare and condition the signal for later and further processing. For example, signal conditioning circuitry 32 may be a decoder or a signal amplifier such that a resulting signal indicative of which ones of the array 12 have been activated will be provided through signal path 34 to a central processing unit 36. Thus, central processing unit 36 will receive specific signals each of which is representative of a particular and specific position of structure 18 and mask 20 with respect to support structure 10.

There is also included a means for correlating the unique random patterns with previously determined discrete or specific relative positions between the first stationary member and the second moving member. This means stores and provides the previously determined information which is representative of a multiplicity of specific relative positions between a particular first member or structure 10 and a particular second member or mask 20 as discussed above. That is, depending upon the unique patterns of photoelements activated there is a selected combination of signals representative of the specific relative position of the particular first and second members to each other. The "look up table" or information storage device such as a read-only memory (ROM) 38 will have stored therein which unique random patterns or combinations of specific photoelectric elements are representative of which specific position of the particular first and second members. That is, there will be one specific combination of activated photoelectric elements for each of the specific relative positions. Also it should be appreciated that in accordance with this invention, although there will typically be several of the photoelectric elements activated for any one particular position it is possible that there may be only a single photoelectric element activated for a particular position. That is, the specific elements activated for any one specific position is completely unique or random with respect to a second specific position. Thus, although neighboring positions may result in some similarity of the photo elements activated, such similarity is not a requirement for the operation of the present invention, and there may be a significant difference in the elements activated in response to a rotation of only one or two degrees.

Thus, it can be seen that the central processing unit 36 includes means for comparing the signals on line 34 representative of the specific photoelectric elements activated with information previously determined for a particular first and second member and stored in a look up table such as ROM 38 to find an exact match or perhaps in some instances the closest match possible. The previously determined and stored relative position information stored in ROM 38 corresponding to the signals on line 34 which is unique to a single specific or particular mask 20 and structure 10 is then read by the central processing unit 36 to determine the specific relative locations of mask 20 and structure 10. This information representing the relative positions is then provided to the positional readout 40 which could of course in a preferred embodiment be a compass readout. Thus, to this point it can be seen there has been described a unique method of providing a positional indicator of extreme accuracy.

It is most important to understand that the positional information required by the ROM's of two substantially identical devices will likely vary and therefore this information must be determined for each and every device produced. Not, just for each different type of device. That is, even if mask 20 and support structure 10 as well as other components of a device are mass produced and are therefore substantially identical, due to manufacturing tolerances and assembly inaccuracies it is very unlikely that the relative positional information required to be stored in ROM 38 for two devices (even though made of identical components) would ever be the same. Consequently, since there may be significant variations in the information stored in the ROM 38 for a first device from that stored in the ROM 38 of a second, yet substantially identical, device, precision placement of the photoelectric array 12 and mask 20 with respect to structure 10 is not necessary and would not normally even be advantageous.

The specific positional information required to be stored in ROM 38 for each device is determined after final assembly of the device by controlled movement of mask 20 with respect to the array 12 on structure 10 to a multiplicity of predetermined precise locations. The unique pattern of activated elements for each location is then recorded. These unique patterns of actuated photoelements for each device will always acurately represent precise locations of the mask 20 with respect to array 12 unless the device is exposed to extreme environmental conditions, is damaged, or is otherwise physically altered.

Figure 2:
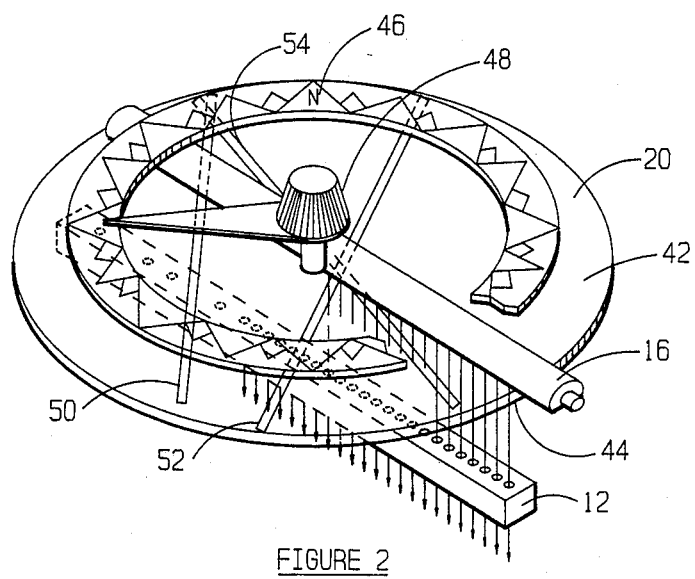
FIG. 2 shows a perspective view of a preferred embodiment of the present invention wherein the invention is adapted to provide compass rose information.

Referring now to FIG. 2, there is shown a perspective view of a specific embodiment of the present invention used for purposes of providing compass readout information. It will be appreciated of course that those elements of FIG. 2 which are common to that of FIG. 1 will carry the same reference numbers. Also, all future Figures which have common reference elements to those already discussed will also carry common reference numbers. As shown, the light source 16 is mounted above a rotating compass card 20 which in turn rotates or pivots in the same manner as a typical magnetic compass. As can be seen, compass card 20 includes a top side 42 and a bottom side 44. As shown, the array of photodetectors 12 is next to the bottom side 44 and the radiant light source 16 is on the top side 42 of mask 20. As can also be seen, radiant light source 16 substantially extends completely across the diameter of the compass card. In a similar manner the photoelectric array 12 also extends substantially across the full diameter of compass card 20. As will be appreciated by those skilled in the compass card art, this is different in that normally the photoelectric arrays of prior art optical compass cards incorporating "Gray Code" would only extend from a point close to the center in a single direction toward the circumference of the compass card. Also as shown, the particular embodiment includes the compass rose 46 and a dial and pointer means 48 for zeroing the compass for initial use. Such pointer and compass rose are shown for illustration purposes only, are not necessary, and are not considered part of the present invention. Of great importance, however, to the present invention, there is shown on compass card 20 a combination of three light transmissive slits 50, 52 and 54. These slits are substantially different from the typically "Gray Code" normally found on optical magnetic compasses. Furthermore, there is no absolute requirement as to the relative position of any of these slits with respect to each other. Although it has been shown in the present embodiment to incorporate three slits, it will further be appreciated, that two slits may be sufficient for many applications. The use of three slits however as may be appreciated after further discussion, is primarily to prevent the possibility of having the same unique and random pattern occur more than once in 360°.

Furthermore, as was discussed before, and as shall now be apparent, precision in placing or locating the array of photodetectors 12 is not necessary since once the device or compass is completely assembled, then the compass can be calibrated by suitable test means and the ROM 38 data determined.

Referring now to FIGS. 3A, 3B and 3C, there are shown successive views of a graphical representation of the multi-element array 16 and the rotating disc mask 20. Also, as can be seen the photoelectric array 12 is shown having about 25 individual elements for illustration purposes only. It will be appreciated that in actual practice the number of elements in the array may be as high as 1000 or more, which of course would greatly enhance the resolution of the compass. As shown in FIG. 3A, slit 50 allows light to pass and impinge upon photoelements, 9 for example, whereas slit 52 allows light to impinge on element 18. However as can be seen, slit 54 is completely removed from the array 12 such that none of the light passing through slit 54 will impinge upon the array. FIG. 3B shows the compass card 20 rotated approximately 90° in a clockwise motion such that at this point slits 50 and 54 respectively allow the individual elements 6, and 21 and 22 to be activated, and slit 52 no longer allows any light to pass and impinge upon the array. Finally, FIG. 3C shows still further rotation of approximately 60° such that at this point all three slits allow light to impinge on certain ones of the arrays. In the embodiment shown, light will impinge on specific elements 1 and 2 through slit 52, 6 through slit 54, and 15 through slit 50.

Figure 4B:
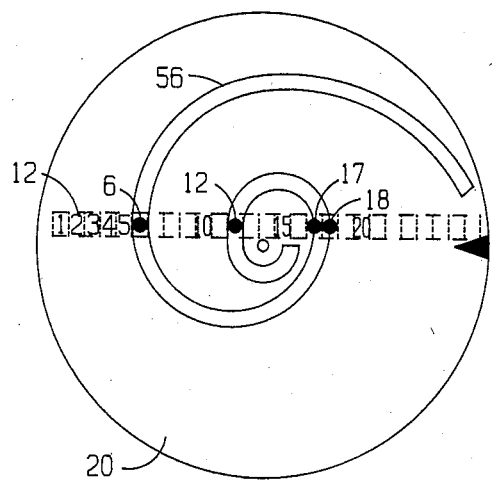
Figure 4C:
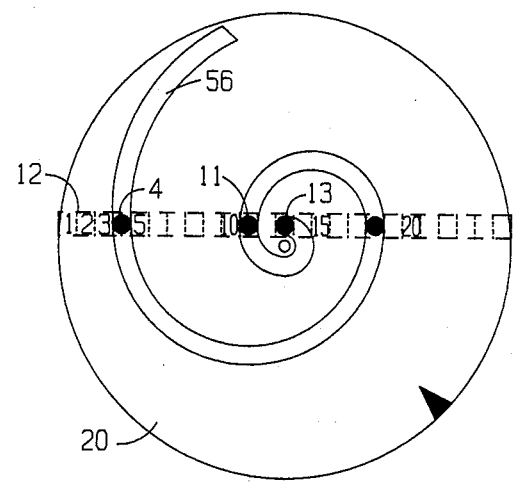

In a similar manner, FIGS. 4A, 4B and 4C, show an alternate embodiment of the present invention wherein rather than using three linear slits, there is shown a single spiral slit 56 starting proximate the center axis of the rotatable disc and spiraling outward to the circumference of the disc. As shown in FIG. 4A, array elements 7, 12, 13 and 21 are exposed and represent a particular angular position. In a similar manner after rotation of the disc 90° and 180° respectively, FIGS. 4B and 4C show representations of the particular photodetector elements which would be illuminated by the light source. For example, elements 6, 12, 17 and 18 in FIG. 4B and 4, 11, 13 and 18 in FIG. 4C.

Figure 5:
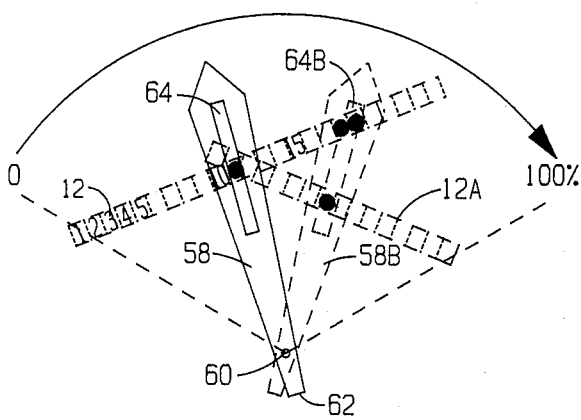
FIG. 5 shows still another embodiment of the teachings of this invention suitable for providing position indications wherein one or more slits on the end of a pivoting elongated member passes in front of one or more arrays of photoelectric detectors.

Although at this point, there has been shown the apparatus of the present invention that would be used for an electro-optical compass or a shaft encoder, it will be appreciated by those skilled in the art that the teachings of this invention may be suitable for use with substantially any type of indicator which provides information as a function of its position. For example, as shown in FIG. 5 there is represented apparatus which may be suitable for a needle or meter type indication showing or representing a deflection value. As shown, an elongated member 58 having a pivot point 60 at one end 62 includes a light transmissive slit 64. Positioned proximate the rotating elongated member 58 there are two arrays 12 and 12A, each having a multiplicity of photoelectric elements. As can be seen, in FIG. 5, rotation of the elongated member 58 will result in a different combination of photodetector elements being illuminated by light passing through slits 64. For example, in the position shown in normal lines, element 16 of array 12 is illuminated, and none of the elements of array 12A are illuminated. However, if the member 58 is rotated around pivot axis 60 to a position such as represented by the member 58A shown in phantom lines, elements 22 and 23 of array 12 are illuminated along with element 3 of array 12A by light passing through transmissive slit 64B. Thus, in the same manner as was discussed heretofore by comparing the particular photodetector elements activated by light passing through the slits to a listing or look up table of all possible angular positions of the member and the appropriate photodetector elements which would be activated, the particular position of the elongated member may be determined. It will be appreciated of course that such a movement could be used to indicate meter movement or any type of angular positioning wherein the exact position is to be reported.

Figure 6:
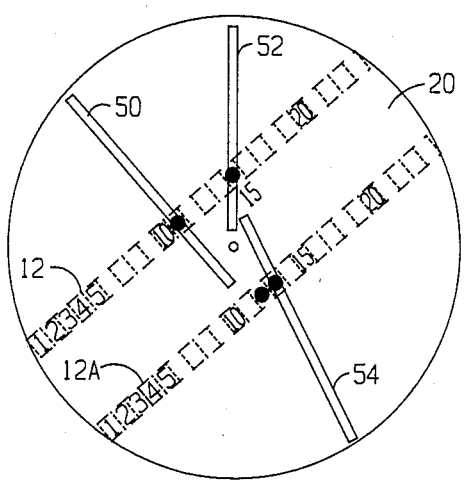
FIG. 6 shows a top view of yet another embodiment using a different arrangement of transmission slits and two arrays of pickup elements.
Figure 7:
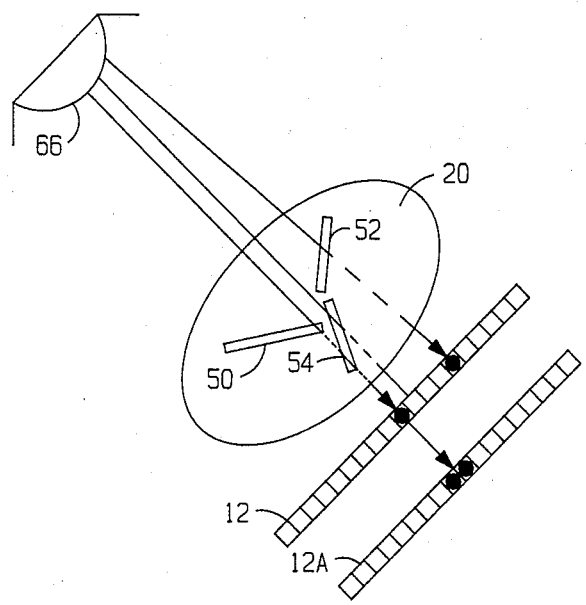
FIG. 7 shows a perspective view of the embodiment of FIG. 6 using a single point source illuminating means.
Figure 8:
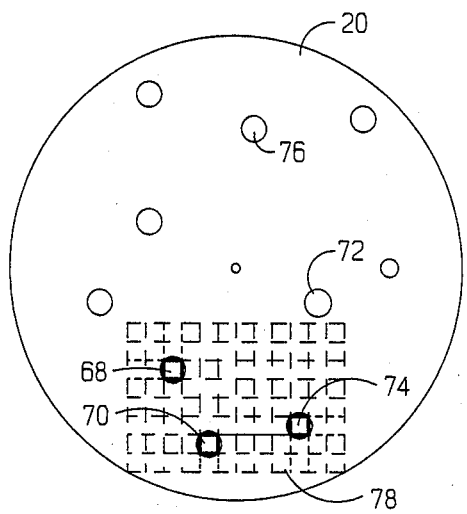
FIG. 8 is a top view of an embodiment using a two dimensional array of photodetector elements in combination with a disk having a multiplicity of small circular transmissive areas.

FIG. 6 shows a top view of an alternate embodiment using three slits 50, 52, 54 and two arrays 12 and 12A. This embodiment is shown operating with a more random light source 66 as shown in FIG. 7 rather than a bar type light source as shown in FIG. 2. FIG. 8 shows still another embodiment wherein the disk 20 includes a multiplicity of transmissive circles such as 68, 70, 72, 74 and 76 rather than a transmissive slit. Also as shown, the array 78 extends in both the X and Y direction such that as shown it is twelve elements long and eight wide. This embodiment is also suitable for operating with the light source of FIG. 7.

Figure 9:
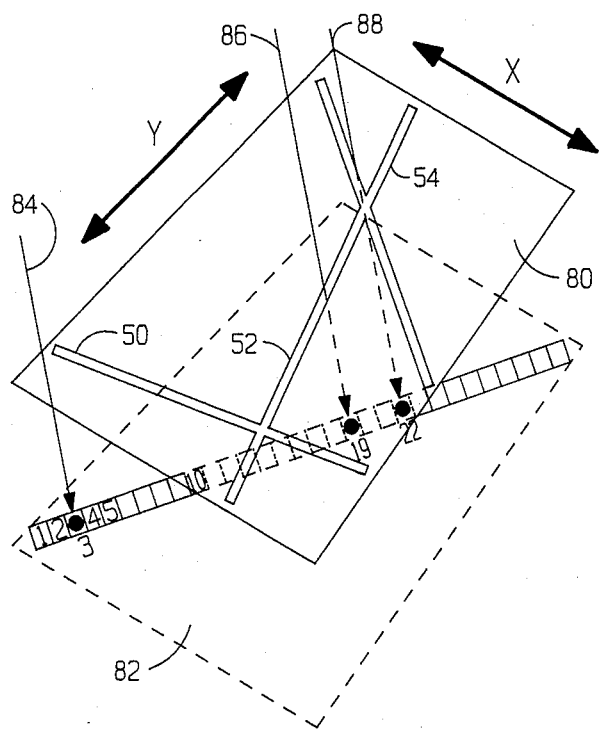
FIG. 9 discloses another embodiment of this invention for determining in two dimensions, (X & Y) the position of one member with respect to another.

Also, as shown in FIG. 9, it is possible to use the teachings of the present invention for purposes of determining the position of substantially any member in an X-Y plane with respect to another member. In the embodiment shown in FIG. 9 rotational movement does not occur, and movement in the X and Y direction is of course limited. As shown, by the use of array 12 selectively positioned and an arrangement of three slits 50, 52 and 54, the X and Y position of the member 80 with respect to member 82 which supports array 12, may be determined. As shown, light rays 84, 86 and 88 impinge on array elements 3, 19 and 22 respectively.

Figure 10:
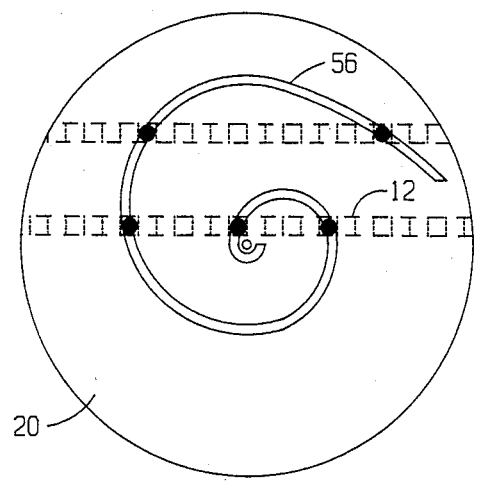
FIG. 10 shows the embodiment of FIG. 4A with a second linear array.

Also as will be appreciated, although all of the embodiments except that of FIG. 6, discussed heretofore have been with respect to a single linear array wherein all of the photodetector elements were fixed with respect to the other, it is also possible to use a pair of arrays of any of the embodiments to further increase the resolution of the device. As an example, FIG. 10 illustrates the device of FIG. 4B wherein a second linear array 12A has been included. As can be seen from FIG. 10 there will be another whole combination of photodetector elements of the second array activated by light passing through the various three slits on the compass card.

Thus, although there has been described to this point particular embodiments of the apparatus for determining the position of one member with respect to the other by the use of two elements which move with respect to the other and a lookup table or read-only memory, it is not intended that such references be considered as limitations upon the scope of this invention except insofar as set forth in the following claims.

What is claimed is:

1. Apparatus for determining the positioning of a first member relative to a second member comprising:
    a first member having a radiant energy source and a multielement array for detecting such radiant energy mounted thereon, said source and said array separated from each other;
    a second member positioned between said source and said array for interrupting radiant energy traveling from said source to said array, said member including at least one transmissive area for transmitting such radiant energy therethrough such that a portion of such radiant energy impinges on selected elements of said multielement array in random patterns which random patterns always reoccur for specific relative positions of said first and second members, but change with relative position changes of said members;
    means for correlating said random patterns with discrete relative positions of said first and second members; and
    output means responsive to said correlating means for indicating a discrete realtive position.

2. Apparatus for determining the position of a stationary first member relative to a moving second member comprising:
    a stationary first member;
    an array of photodetectors mounted on said stationary member;
    a light source mounted on said stationary member separated from said photodetector array;
    a light transmissive second member movably mounted between said photodetector array and said light source;
    said transmissive member having a light transmission area such that it allows said light source to illuminate selected photodectors in random patterns, which random patterns repeat for specific relative positions of said first and second members, but change with position changes of the moving second member; and
    electronic means for correlating said random patterns with discrete positions of the moving second member relative to the stationary first member.

3. Apparatus for determining the angular position of a stationary first member relative to a rotating second member comprising:
    a stationary first member;
    an array of photodetectors mounted on said stationary member;
    a light source mounted on said stationary member separated from said photodetector array;
    a light transmissive second member rotationally mounted on a pivot axis for rotational movement between said photodetector array and said light source;
    said transmissive member having a light transmission area such that it allows said light source to illuminate selected photodectors in random patterns, which random patterns repeat for specific relative positions of said first and second members, but which change with position changes of the rotating second member in a single revolution of said rotating second member; and
    electronic means for correlating said random patterns with discrete positions of the rotating second member relative to the stationary first member.

4. Apparatus for determining the positional relationship between a first and second member, said apparatus comprising:
    a first member having a multielement array of means for detecting selected radiant energy, each element of said multielement array for providing an output signal indicative of said selected radiant energy impinging thereon, and each element of said multielement array maintained in a fixed positional relationship with every other element of said array, said first member further including a radiant energy source positioned for directing said selected radiant energy toward said multielement array;
    a second member positioned between said multielement array and said selected radiant energy source for substantially blocking said selected radiant energy from impinging on said array, said member including at least one transmission area for transmitting such radiant energy therethrough so that a portion of said radiant energy from said source impinges on specific elements of said array of detecting means for each specific relative position of said first and second member;
    means for storing and providing information representative of a multiplicity of said specific relative positions between said first member and said second member as a function of the specific elements of said array upon which said radiant energy impinges at each of such multiplicity of specific relative positions, each of said multiplicity of positions providing a different and random combination of elements of said array receiving radiant energy; and
    output means in communication with said means for storing and providing for indicating a specific relative position existing between said first and second members in response to which specific elements of said array receive said radiant energy from said source through said transmissive area.

5. The apparatus of claims 1, 2, 3 or 4 wherein said second member comprises a disc shaped mask, said transmission area defining a line extending from said center of said disc in a spiral manner towards the circumference of said disc, said first member and said mask suitable for rotational movement with respect to each other around the axis of said disc.

6. The apparatus of claims 1, 2, 3 or 4 wherein said second member comprises a disc shaped mask having a pivot axis for rotation thereabout, said transmission area comprises at least two non-parallel elongated areas on said disc, said first member and said mask suitable for rotational movement with respect to each other around said pivot axis of said disc.

7. The apparatus of claims 1, 2 or 4 wherein said determined position is the angular deviation of said first member with respect to said second member.

8. The apparatus of claims 1, 2, 3 or 4 wherein said array is arranged along a straight line.

9. The apparatus of claims 1, 2, 3 or 4 wherein said array comprises at least two straight line arrays located at a fixed position with respect to each other.

10. The apparatus of claims 1, 2 or 4 wherein said second member is an elongated member extending from a pivot end towards a free end, and said second member moves with respect to said first member by rotational movement around said pivot end.

11. The apparatus of claims 1, 2 or 4 wherein one of said first and second members are suitable for X and Y two dimensional movements within a known plane with respect to the other one.

12. The apparatus of claim 5 wherein said array is arranged along a straight line.

13. The apparatus of claim 6 wherein said array is arranged along a straight line.

14. The apparatus of claim 6 wherein said array comprises at least two straight line arrays located at a fixed position with respect to each other.

15. The apparatus of claim 10 wherein said array comprises at least two straight line arrays located at a fixed position with respect to each other.

16. The apparatus of claim 11 wherein said transmission area comprises at least two non-parallel elongated areas.

17. The apparatus of claim 16 wherein said array is arranged along a straight line.

* * * * *